United States Patent [19]

Spencer et al.

[11] 4,043,689
[45] Aug. 23, 1977

[54] MODULAR CEILING SYSTEM

[75] Inventors: William H. Spencer, La Verne; John O. Dorius, Pasadena, both of Calif.; James D. Brown, Clarksville, Ark.

[73] Assignee: Trend Ceilings Systems Co., Los Angeles, Calif.

[21] Appl. No.: 658,481

[22] Filed: Feb. 17, 1976

Related U.S. Application Data

[62] Division of Ser. No. 221,143, Jan. 27, 1972, Pat. No. 3,949,533.

[51] Int. Cl.$^2$ .................................... F16B 21/08
[52] U.S. Cl. .................................... 403/252; 52/39; 52/664; 52/667; 52/710; 403/345
[58] Field of Search .............. 52/758 A, 667, 144, 52/488, 665, 664, 39, 27, 28; 403/252, 345

[56] References Cited

U.S. PATENT DOCUMENTS

| | | | |
|---|---|---|---|
| 1,101,745 | 6/1914 | Jones | 52/667 |
| 3,023,865 | 3/1962 | Brandstetter | 52/475 |
| 3,084,401 | 4/1963 | Findlay | 52/484 X |
| 3,094,285 | 6/1963 | Kruger | 52/28 X |
| 3,096,862 | 7/1963 | Purdy | 52/665 |
| 3,119,475 | 1/1964 | Adams | 52/573 |
| 3,193,063 | 7/1965 | Brown | 52/667 |
| 3,321,879 | 5/1967 | Purdy | 52/665 |
| 3,369,332 | 2/1968 | Harlan | 52/667 |
| 3,450,871 | 6/1969 | Segil | 52/28 |
| 3,655,961 | 4/1972 | Hover | 52/28 |
| 3,685,235 | 8/1972 | Lang | 52/39 |

Primary Examiner—John E. Murtagh

[57] ABSTRACT

A modular ceiling system utilizing a plurality of stringers interlocked with one another to provide a high strength, non-warping suspended ceiling grid assembly. The T-shaped stringer employed in the grid assembly has a channel-shaped T-head designed to support acoustical ceiling tiles flush with the lower edge of the stringers. The main stringers are arranged parallel to one another and interlocked to secondary stringers to provide a grid of four sided cells. Part of the secondary stringers have the same length as one side of a single cell and others are of double that length. The double length secondary stringers are constructed to have a snug snap-lock joint with the main stringers whereas the single length secondary stringers have a snug, non-locking fit between the mid-portions of the double length stringers. A lighting unit occupies a pair of adjacent grid cells and is installable selectively with its length extending either lengthwise or transversely of the main stringers and includes provision for supplying and exhausting ventilating air. The downwardly opening channels of the T-head portions of all stringers serve multiple functions, including an anchorage for various suspended objects, room divider partitions, etc.

22 Claims, 14 Drawing Figures

MODULAR CEILING SYSTEM

This is a division of our application for U.S. Pat. No. 221,143 filed Jan. 27, 1972 now Pat. No. 3,949,533 entitled MODULAR CEILING SYSTEM.

This invention relates to suspended ceiling systems and more particularly to an improved grid-forming stringer and to a snap-lock joint for holding components thereof rigidly assembled to provide a highly versatile rigid, non-wraping grid assembly adapted to support acoustical ceiling tiles and a combined illuminating and ventilating unit in a unique manner.

A wide variety of suspended ceiling systems have been proposed heretofore utilizing many different techniques for supporting acoustical tile as well as ventilating and illuminating devices. However, these various proposals are subject to serious disadvantages and shortcomings avoided by the present invention. It has been customary to employ long stringer components arranged in criss-cross fashion and suspended at a desirable level with provision for supporting the ceiling tile proper. It has been common practice to utilize a gridwork having stringers formed from extruded or sheet metal and connected together at intersections by various expedients. Stringers of this type are easily deformed after, prior to, or as an incident to their installation, with the result that the ceiling tiles do not interfit properly therewith or are supported in a distorted, non-level or non-uniform manner. But even if properly installed initially, such ceiling structures warp, buckle or become distorted by hazards normally encountered in the use of the facility or by careless or unskilled technicians while servicing, redecorating or gaining access to the overhead area for some reason.

There is also need from time to time to subdivide the working space below the ceiling to suit changing needs for the use of the building. Such changes often involve rearrangement of wall divider partitions with a related need for rearranging and re-orienting the lighting and ventilating facilities. Prior suspended ceiling assemblies either lack these capabilities or possess them only to a limited degree. Prior suspended ceiling systems also lack proper and desirable provision for anchoring room dividers in any selected position in the system or to hang items, curtains and the like, from any selected point in the grid network. Additionally prior ceiling constructions necessitate anchoring the partitions and the like to the ceiling in a manner causing unsightly defacement if the partitions are subsequently moved.

It is therefore a primary object of the present invention to provide a greatly improved ceiling grid system avoiding the foregoing and other shortcomings. This is accomplished employing a basically new stringer configuration formed of thick walled stock as, for example, extruded aluminum. This stringer is characterized as being of T-shape in cross-section with the hollow T-head portion channeled and opening downwardly with inturned lips lying flush with the lower surface of the completed ceiling and providing an anchorage for suspended items as well as for wall dividers and the like. The main stringers extend lengthwise of the space to be covered and are connected by secondary stringers including double length stringers having a unique connection at each end with a pair of main stringers, and having their mid-length portions connected through similarly unique but non-locking joints by single length stringers. In the unique joint between a first stringer and two secondary stringers abutting the opposite sides thereof, the first stringer has opposed notches in the sidewalls of its channel shaped hollow T-head sized and shaped to have a snug nesting fit with the notched ends of the T-heads of the secondary stringers. Long tongues formed in the T-stems of the cross stringers lie in side-by-side relation through a rectangular opening in the T-stem of the first stringer. This design provides an exceptional strong joint wherein the three stringers are precisely located and firmly anchored against bending, twisting or buckling. To hold the stringers assembled suitable fasteners are employed. For this purpose certain of the joint tongues preferably include snap tabs which engage and lock the stringers assembled. The tongues of stringers interconnecting the midportions of stringers previously locked assembled need not be equipped with fasteners or locking tabs since they have a length such that the ends of their T-heads firmly abut the notched edges of the T-heads of the stringers being joined together.

The resulting grid work comprises a multiplicity of rectangular cells of unusual strength and ability to resist twisting, bending, buckling and distortion out of the grid plane. The acoustical tile plaques are supported on the bottom portions of the channel-shaped T-heads with their lower surfaces lying flush with the lower edges of the stringers.

Lighting and ventilation is provided by a combination unit typically occupying two complete grid cells with its mid-width straddling either a main or a secondary stringer. Accordingly, the lighting and ventilating unit can be readily moved to occupy a position either parallel or at right angles to the main stringers. Also these units can occupy any pair of grid cells simply by shifting the tiles to cover the previous lighting position as the unit is transferred to the selected new position.

Accordingly, it is a primary object of the present invention to provide an improved stringer member for a suspended ceiling system.

Another object of the invention is the provision of an extruded aluminum stringer for use in a suspended ceiling grid assembly and featuring a hollow T-head with inturned lips providing an anchorage for any of various underlying facilities.

Another object of the invention is the provision of an improved high strength precision joint at the junction of crossing stringers of a suspended ceiling grid assembly highly resistant to distortion, bending, twisting, buckling, warping and the like deformities.

Another object of the invention is the provision of an improved joint between the stringers of a ceiling grid assembly wherein all stringers are held rigidly and firmly internested at points of intersection with abutting surfaces mutually cooperating to resist relative movement either within or out of the plane of the grid.

Another object of the invention is the provision of a rigid, non-distortable ceiling grid assembly comprising a plurality of main stringers rigidly interlocked by an H-shaped sub-unit.

Another object of the invention is the provision of a ceiling grid assembly comprising a plurality of parallel main stringers interlocked by a multiplicity of H-shaped sub-units.

Another object of the invention is the provision of a modular, suspended ceiling grid assembly subdivided into cells by extruded T-shaped stringers held locked together by snap action joints.

Another object of the invention is the provision of a suspended ceiling grid assembly comprising T-shaped stringers having complementally shaped interfitting T-heads and T-stems which automatically interlock upon reaching their fully assembled positions overlapping flat surfaces of each in direct planar contact with one another.

Another object of the invention is the provision of a suspended ceiling grid assembly of interlocked cells, any aligned pair of which can be selectively used to support an illuminating unit readily convertible to additional use for ventilating purposes.

Another object of the invention is the provision of a combined ventilating and illuminating unit designed to straddle a ceiling grid member and to overlie and occupy any adjacent aligned pair of grid cells and readily shiftable at any time to any other aligned pair of cells in the grid assembly.

Another object of the invention is the provision of a suspended ceiling grid assembly including an H-shaped sub-assembly of stringer elements, the opposite ends of which are designed to have an interlocking snap fit with openings through the T-stem portions of a pair of main stringers.

These and other more specific objects will appear upon reading the following specification and claims and upon considering in connection therewith the attached drawing to which they relate.

Referring now to the drawing in which a preferred embodiment of the invention is illustrated:

FIG. 14 is a cross-sectional view similar to FIG. 15 but showing a closure plate intalled in lieu of the exhaust air fitting.

Figure 1:
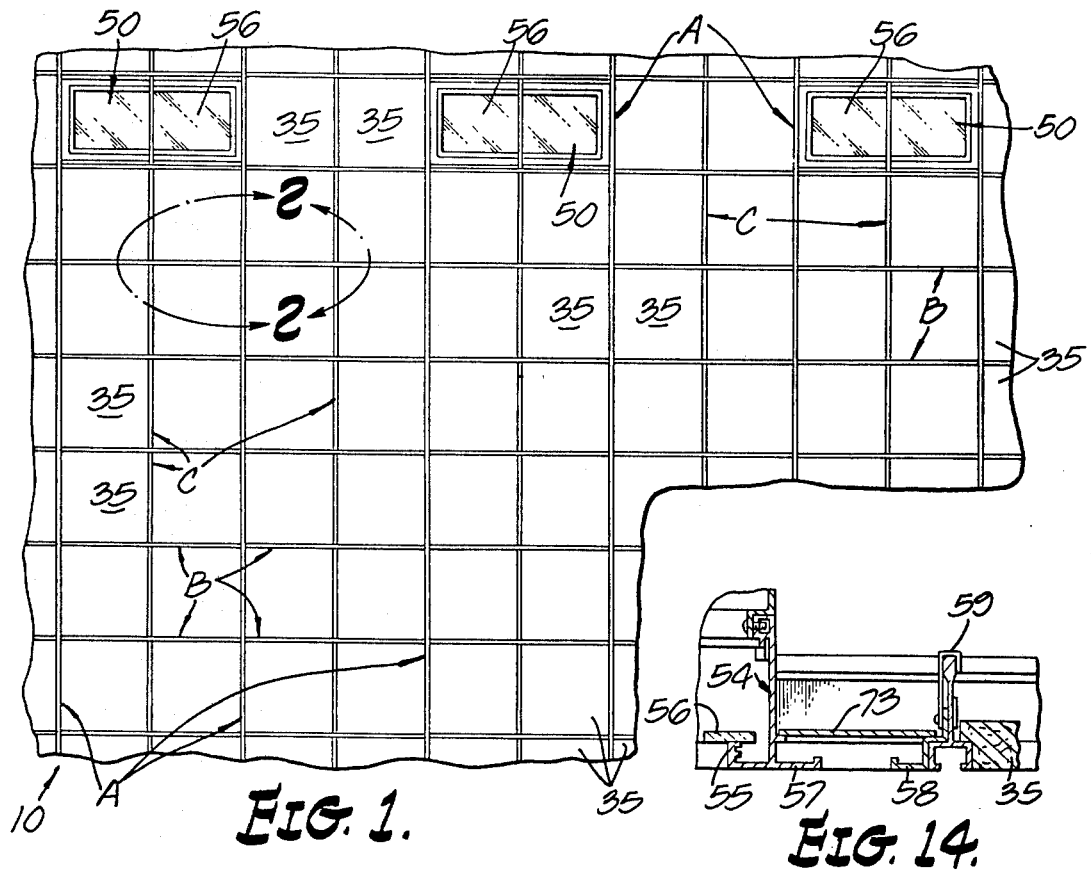
FIG. 1 is a fragmentary, bottom plan view of a fully assembled ceiling embodying one preferred embodiment of the invention.
Figure 2:
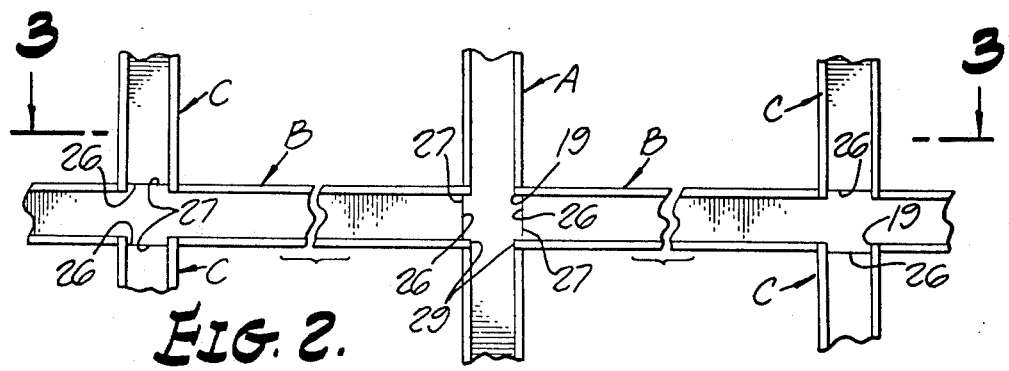
FIG. 2 is a fragmentary plan view of an enlarged scale taken in area 2—2 on FIG. 1 crosswise of one main stringer and adjacent secondary stringers.
Figure 3:
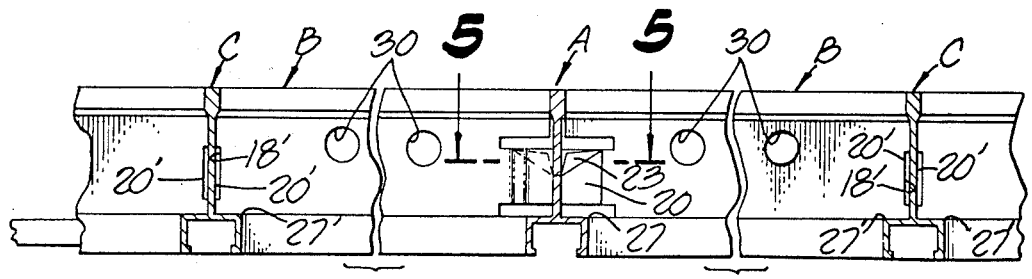
FIG. 3 is a fragmentary cross-sectional view taken along line 3—3 on FIG. 2 and illustrating centrally thereof a snap-in, locking joint and, to either side thereof, a pair of non-locking joints.

Referring initially more particularly to FIGS. 1, 2 and 3, there is shown an illustrative embodiment of the invention suspended ceiling, designated generally 10, featuring a rigid grid assembly formed by a plurality of parallel stringers A,A arranged parallel to one another and spaced two grid cells apart. These main stringers are interlocked to double-length pairs of secondary stringers B,B. The mid-portions of stringers B,B are interconnected by single length secondary stringers C,C. An adjacent pair of double stringers B, B and the intervening single stringer C comprise an H-shaped sub-unit which forms a pair of square grid cells when the ends of its legs are interlocked with a pair of main stringers A,A.

Figure 4:
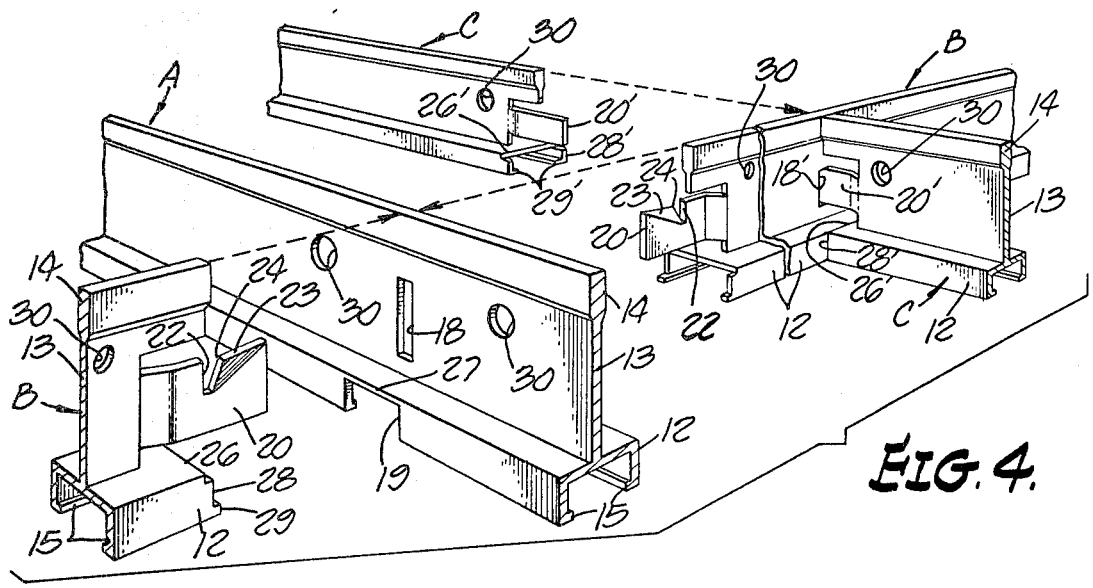
FIG. 4 is an exploded view of a snap-in locking joint and of a non-locking joint, both in the process of being assembled.

It will be understood that all stringers A,B and C are of T-shape and differ from one another only in length and in the manner in which their ends are formed for interlocking assembly to form a rigid grid of square cells although they may be of rectangular configuration if desired. Details of the grid assembly are best shown in FIG. 4 wherein the stringer A will be seen to have a hollow T-head 12 herein shown as being channel-shaped with the mid portion of its bottom integral with a wide T-stem 13 thickened along its free edge 14 to stiffen it. The free edges of the channel-shaped T-head have inturned lips 15,15 serving various functions and purposes as will be explained more fully presently.

The snap-in lock joint between the stem portions of stringers A and the double length cross stringers B will now be described with the aid of FIGS. 4 and 5. For this purpose, T-stems 13 of the main stringers are formed with rectangular or elongated cutouts or openings 18 spaced apart by the length of one side of the square grid cells and having a width double the thickness of the central portion of T-stems 13. The two sidewalls of channel shaped T-head 12 are also provided with cutouts openings or notches 19,19 having a width equal to the transverse dimension of the T-head and a depth flush with the interior bottom wall of the T-head. It will therefore be appreciated that notches 19 are sized to receive specially shaped ends of the sidewalls of the T-head 12 of the double length stringers B.

Each end of stringers B is shaped as shown in FIG. 4. Thus the opposite ends of T-stems 13 are notched lengthwise thereof to form a long tongue 20 projecting beyond the portions of the T-stem to either side thereof. One edge of tongue 20 is deeply notched transversely thereof as is indicated at 22, and the triangular-shaped portion of the free end of the tongue contiguous to notch 22 is bent out of the plane of the notch to form a resilient locking tab 23. Corner 24 of this tab is positioned to engage the remote lateral rim edge of opening 18 of main stringers A as a pair of the tongues on an associated pair of stringers B,B are assembled in side-by-side relation through openings 18 of the main stringers until their T-heads are fully assembled within notches 19. The fully assembled interlocked condition of stringers A and B is best illustrated in FIG. 5, it being noted that corners 24 of the tabs 23 are there shown as engaged with the rim edges at the opposite ends of opening 18. It will also be observed from FIG. 5 that tongues 20 at the opposite ends of the double length stringers B are offset in opposite directions by one-half of the thickness of the T-stem. It will also be understood that the width of opening 18 is double the thickness of tongues 20 with the result that these tongues have a snug sliding fit with the edges of opening 18.

The opposite ends of the T-head portion of stringers B are punched or blanked to have the shape illustrated in FIG. 4. Thus, the bottom of the T-head is notched so that edge 26 seats flush against corner edge 27 (FIG. 3) of the main stringer T-head. The end edge 28 of the sidewalls of the T-head are dimensioned to lie flush against the interior surface of the T-head in the assembled position of the joint. Likewise end edge 29 lies flush with the inner edge of lip 15 of stringer A.

Figure 5:
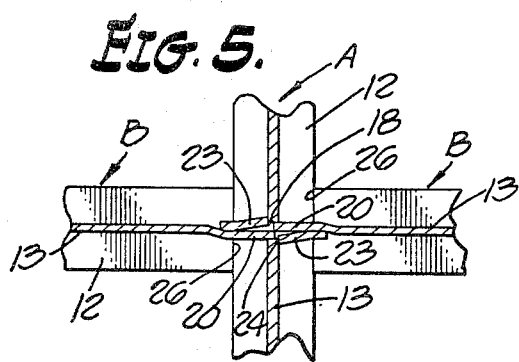
FIG. 5 is a cross-sectional view of a snap-in joint taken along line 5—5 on FIG. 3.

Thus, it will be clear from the foregoing and from FIGS. 2, 4 and 5 all axial surfaces of openings 18 and 19 and all transverse end surfaces of the T-head portions of the stringers mating with openings 19 lie in planes normal to the T-stems of the respective stringers. Hence, in the assembled positions of the stringers, there are multiple sets of juxtaposed planar surfaces in direct abutting contact cooperating to resist relative twisting, rotary and buckling movement with all elements of the grid system locked in the plane of the system.

Details of the non-locking joint between the single length stringer C and the mid portion of the double length stringers B are illustrated in FIG. 3 and in the upper end portion of FIG. 4. It will be understood that the ends of stringers C are notched and provided with tongues exactly like those described above with the exception that tongues 20 ′ are not notched crosswise of one lateral edge nor are they provided with a locking tab 23. However, tongues 20′, at the opposite ends of the stringers, are offset one-half the thickness of the T-stem so as to lie side-by-side and snugly within the elongated openings 18′ in the mid-length of stringers B. It will be appreciated that the joint between stringers B and C have a snug sliding fit but do not positively interlock with one another as do the joints between stringers A and B. However, owing to the fact that stringers A and B are positively interlocked, stringers C are held in aligned assembled relation substantially without play between any of the abutting surfaces and are substantially as effective in preventing twisting, bending, flexing, warping and buckling because of the snug fit of the parts and the action of the positively interlocked joints to either side thereof.

The assembly of the grid is accomplished by suspending main stringers A in parallel arrangement by the use of suitable suspensionwires having their ends extending through openings 30,30 (FIG. 3) located at frequent intervals along the length of their T-stems. The assemblers then proceed to install the double length transverse stringers B,B between the main stringers by inserting tongues 20,20 from the opposite ends of openings 18. Stringers B are pressed firmly toward one another from the opposite sides of the T-stem of stringers A until each of the resilient locking tabs 23 snap into locking position. Owing to the camming action provided by the inclined upper edge of tabs 23 and the resiliency of the material, these tabs are flexed substantially into the plane of tongues 20 as they are being forced into their assembled positions and then snap back into their former positions as tongues 20 reach a fully assembled position. In other words, once the shouldered edge surface 26 of the T-head abuts the edge of the web portion of the T-head, tabs 23 are free to resume their deflected locking position shown in FIGS. 4 and 5.

The double length stringers B having been assembled, the installer then proceeds to install the single length stringers C between the mid portions of stringers B. The tongue at one end is inserted into its adjacent opening 18′ of stringer B following which the similar tongue at the other end is inserted in the similar opening 18 ′ of the adjacent stringer B by bowing one or both of the stringers B away from one another sufficiently for insertion of the second one of tongues 20′. In this manner the installer proceeds to install the C stringers one by one, bowing stringers B away from one another as necessary to effect assembly of the joints between tongues 20′ and openings 18′. This having been accomplished, a very rigid grid assembly 10 is provided, with all stringers supported in a horizontal plane from suspension wires, not shown, but having their lower ends hooked through openings 30,30 in the various stringers.

Figure 8:
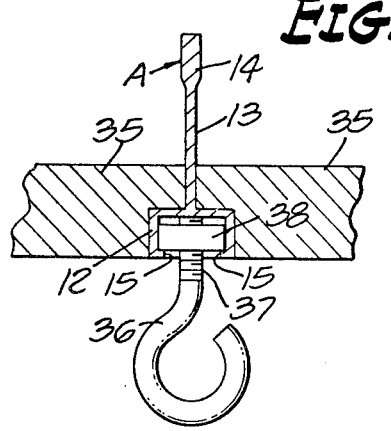
FIG. 8 is a cross-sectional view through a stringer showing a suspension hook for supporting a curtain or other object from the grid assembly.
Figure 9:
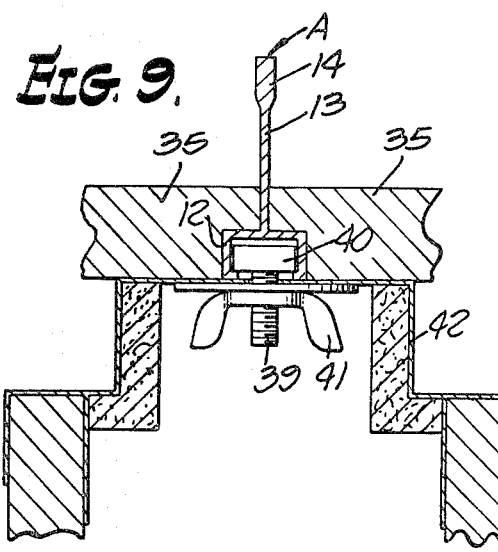
FIG. 9 is a cross-sectional view similar to FIG. 8 but showing a stringer T-head in use to anchor a wall divider partition to the grid assembly.

It will be understood that acoustical tile or ceiling plaques 35 hve their lower rim edges rabbeted as best shown in FIGS. 8 and 9 so as to conform with the stringer T-head 12. These rabbeted edges are so dimensioned that the lower surface of the plaques or tiles lies flush with the lower surfaces of the stringer T-heads. Sufficient clearance is left between the edges of the plaques and the stringers to permit the plaques to be inserted edgewise from below to a level above the T-heads and then lowered flatwise into their installed position in accordance with well known practice.

Referring to FIG. 8, it will be understood that a simple accessory installable in the channels of the T-head can be utilized to suspend curtains, charts, film projection screens and a wide variety of items from any selected point in the ceiling. One of the many accessories and anchorages for this purpose comprises an eyebolt 36 having its threaded shank 37 mating with a nut 38 having a loose sliding fit along the T-head with its edges resting on the inturned lips 15. Nut 38 can be inserted at any grid joint by appropriate manipulation of the nut and then slid to any selected position along the stringer. At the selected location the eye bolt is simply tightened until its inner end abuts the bottom of the T-head to force the nut into tight engagement with the lips.

Referring to FIG. 9, a variant type of the anchorage is shown as comprising a bolt 39 having its head 40 freely slidable along the interior of any stringer T-head and a wing nut 41 assembled over its threaded shank. This type of anchorage provides a convenient mode of anchoring a wall partition header 42 to any selected stringer or group of stringers of the grid system. This provides a simple, highly versatile means of suodividing the space below the ceiling into any of a large variety of sizes and shapes of compartments.

Figure 6:
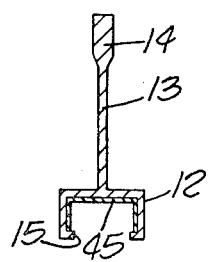
FIG. 6 is a cross-sectional view through a stringer having one type of decorative insert assembled in the T-head thereof.
Figure 7:
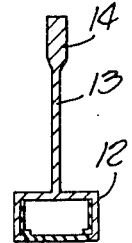
FIG. 7 is a view similar to FIG. 6 but showing an alternate type of decorative insert assembled to the T-head.

FIGS. 6 and 7 are illustrative of two different types of decorative inserts which can be utilized as readily changeable covers or liners for the exposed channel surfaces of the T-head. Insert 45 comprises a continuous length of thin-walled, semi-rigid plastic material of any desired color or finish readily inserted from one end of the T-head with either edge of its sidewalls resting on the inturned lips 15. Thus it will be understood that it can be installed as shown or inverted so that its bottom rests on lips 15. An alternate type of insert 46 is shown in FIG. 7. This insert is contoured for insertion with its web portion lying flush with the free edges of the T-head.

The combined lighting and ventilating facility, designated generally 50, will now be described with particular reference to FIGS. 1 and 10 to 14. As herein illustrated by way of example, unit 50 occupies a pair of adjacent grid cells with its mid portion suitably channeled to straddle a stringer, such as stringer C common to a pair of adjacent grid cells. It will be understood that unit 50 may be installed with this channel straddling any one of stringers A, B or C.

The main body of unit 50 comprises a rectangular downwardly opening casing 51 supporting several fluorescent light bulbs 52. Secured to the lower edge of casing 51 is an adapter frame 52 secured, as by self-threading screws 53, to a channel extending along the upper inner rim of a frame 54. This frame is fabricated from extruded aluminum strips having the configuration clearly shown in FIGS. 11 to 14.

The lower rim of frame 54 is generally T-shaped in cross section and includes an inner ledge 55 terminating at a level coplanar with the upwardly facing bottom portion of the stringer T-heads 12. This ledge supports the light-transmitting lens or panel 56 which merely rests thereon by gravity. Lens 56 is so proportioned that it can be removed in well known manner by tilting it through an appropriate angle. The outwardly projecting ledge 57 of frame 54 forms the inner edge of a ventilating passageway along either longer side of the lighting unit. The other edges of the ventilating passages are formed by extruded strips 58 secured to hanger strips 59 engaged over the upper edge of the adjacent one of the stringers. It will be understood that strips 58 are shaped to rest against the exterior edge of the T-head of the stringer with its bottom portion lying flush with the lower surface of the ceiling and the adjacent lower surface of portion 57. As will be apparent from the foregoing, strip 58 extend along either longitudinal side of unit 50 and cooperate with ledges 57 in providing either or both air inlet and air outlet passages.

Figure 10:
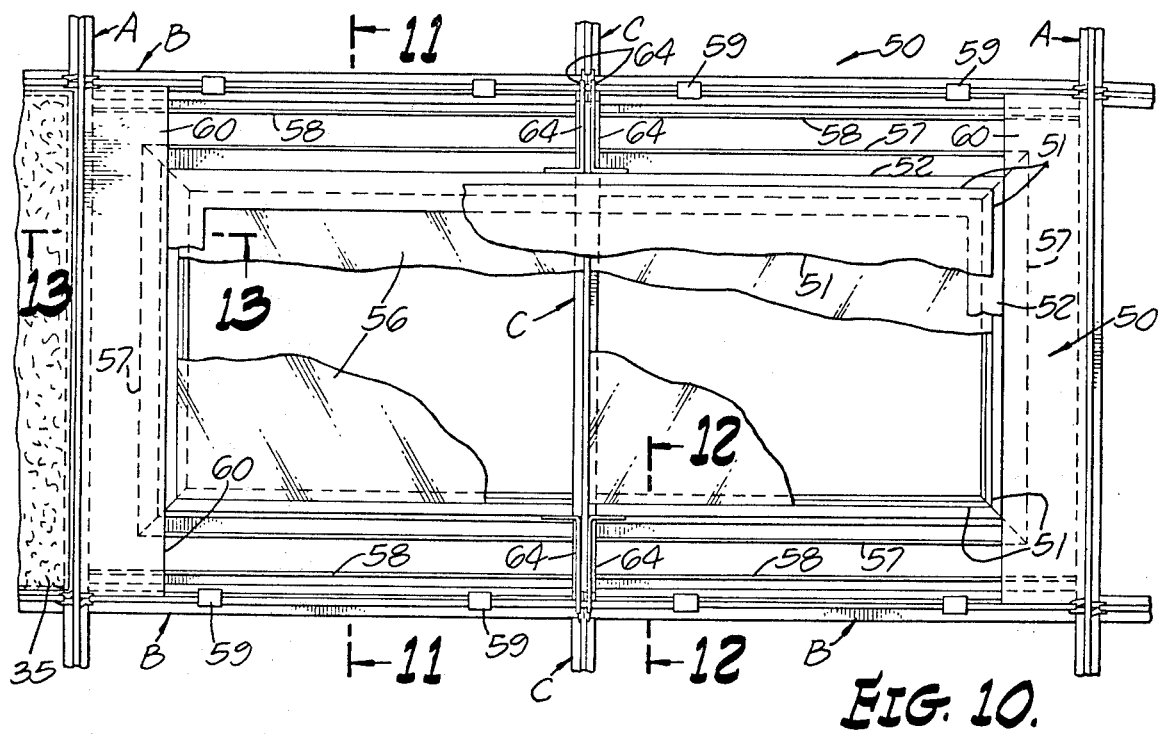
FIG. 10 is a top plan view of the grid assembly looking downwardly onto a pair of grid cells having a lighting unit installed therein with parts of the lighting unit broken away to show structural details.

As is best shown in FIG. 10, lamp casing 51 terminates inwardly from main stringers A,A and this space is closed by a pair of channel-shaped strips 60 (FIGS. 10, 13) secured, as by screws 61, to frame members 54 along either transverse end of the lighting unit. The outer edges 62 of members 60 rest on the T-head of the adjacent stringer and provide a major support for unit 50 on the grid system. Cooperating with members 60 in supporting unit 50 are pairs of hook-shaped hanger brackets 64 (FIGS. 10, 12) projecting from the midportion of the unit and fixed to the sides of members 54. These hangers engage over the upper edges of the stringers.

Incoming fresh air is supplied through the ceiling by flexible ducts 65 (FIG. 11) opening into plenum chambers 66 (FIG. 11) having outlets opening downwardly with their edges seated against the interior surfaces of ledges 57 and 58 along one side of unit 50. Outlet 67 will be understood as having a portion straddling stringer C traversing the midlength of the outlet. It will also be understood that the outlet opening proper is regulatable by any suitable adjustable flow director such as the pivoting vane indicated by the dot and dash line at 69.

Figure 11:
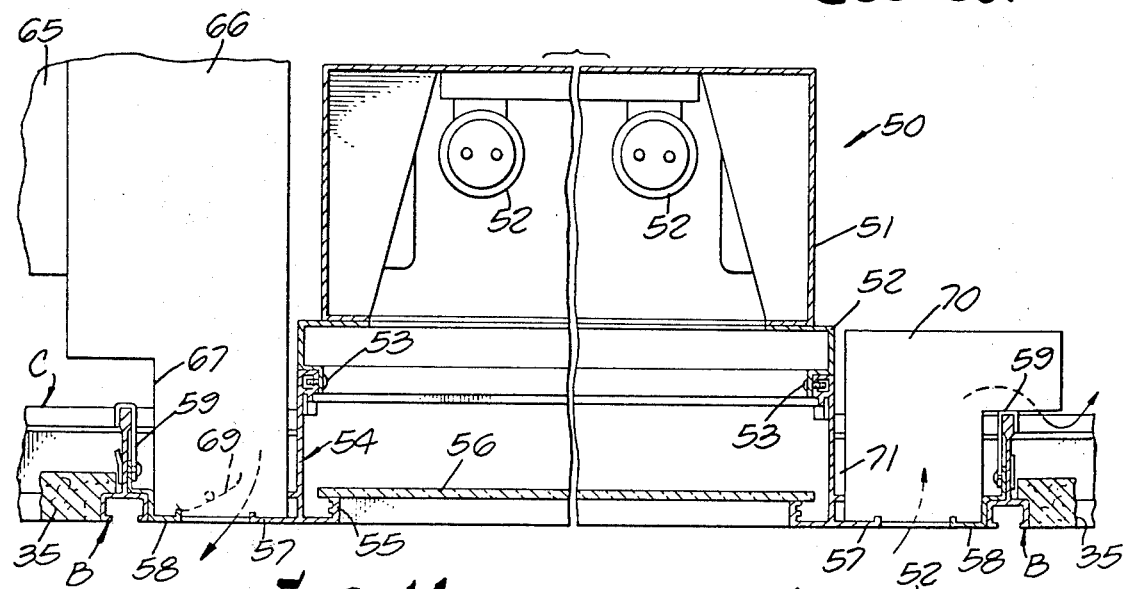
FIG. 11 is a cross-sectional view taken along line 11—11 on FIG. 10 showing, in addition to the lighting unit, a fresh air supply chamber installed along one side of the lighting unit and an exhaust air chamber installed along the outer side thereof.
Figure 12:
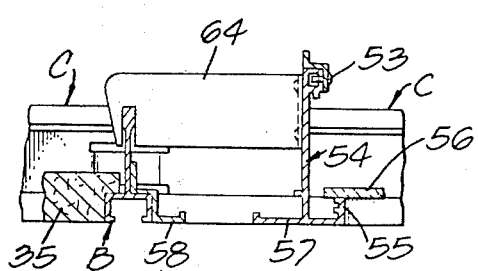
FIG. 12 is a cross-sectional view taken along line 12—12 on FIG. 10.
Figure 13:
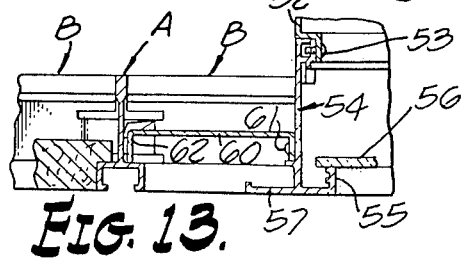
FIG. 13 is a cross-sectional view taken along line 13—13 on FIG. 10.

An exhaust air outlet fixture 70 (FIG. 11) has its inlet end 71 similarly resting on the interior surfaces of ledges 57, 58 with its outlet overlying the adjacent stringer B in the manner shown in FIG. 11. Some of the units 50 may not require an air outlet fitting 70 and, in this case, unit 70 is omitted and in its place a plate 73 (FIG. 14) is inserted with its lateral edges resting on the flanges of members 54 and 58.

From the foregoing it will be evident that the combined lighting and ventilating unit 50 together with the air fittings 66, 70 can be readily moved to occupy any pair of adjacent grid spaces. This is done by first removing the acoustical tile 35 from a selected pair of grid cells and then equipping the longer side of these cells with sets of members 58, 58 with their hanger hooks 59 engaged over the upper edges of a pair of stringers. Unit 50 is then lifted from its former location and lowered into the newly selected pair of grid cells intil plate 60 extending its opposite ends and its hanger hooks 64 come to rest against the supporting surfaces of the grid assembly. Air chambers 66, 70 are then returned to their former respective assembly positions. The lighting unit and the air ventilating system is now ready for operation in its new location without need for the services of an electrician or other skilled labor.

While the particular modular ceiling system herein shown and disclosed in detail is fully capable to attaining the objects and providing the advantages herein before stated, it is to be understood that it is merely illustrative of the presently preferred embodiment of the invention and that no limitations are intended to the detail of construction or design herein shown other than as defined in the appended claims.

We claim:

1. In combination, a ceiling grid joint assembly comprising a first continuous lightweight extruded stringer of T-shape in cross-section and characterized by a channel shaped T-head having an open side facing away from and lying in a plane normal to the T-stem portion thereof, said T-stem portion having rectangular opening therethrough with its longer dimension extending normal to the web of said channel shaped T-head and its shorter dimension corresponding to double the thickness of said T-stem portion, the sidewalls of said T-head having identical notches in direct alignment with one another crosswise of said T-head in an area opposite the adjacent end of said rectangular opening, said notches having a depth flush with the interior bottom surface of the web of said T-head and a width corresponding to the distance between the exterior sidewall surfaces of said T-head, second and third stringers of the same size and shape as said first stringer and interlocked therewith from the opposite sides of said first stringer, said second and third stringers each being formed in the T-stem portion thereof with a latching tongue inserted one from either side of said first stringer with said latching tongues lying side by said through rectangular opening and having tabs having interlocking engagement with a rim edge of the adjacent longer side of said rectangular opening and with the ends of the T-heads of said second and third stringers seated in an adjacent one of an associated one of said pair of identical notches in the T-head of said first stringer.

2. The combination defined in claim 1 characterized in that the adjacent T-head ends of said second and third stringers are seated in said identical notches of said first stringer with their mating surfaces flush with one another, and the tabs of said latching tongues of said second and third stringers being sized to lock said first, second and third stringers internested and against relative movement.

3. The combination defined in claim 2 characterized in that said latching tongues have a width corresponding generally to the longer dimension of said rectangular opening in said first stringer, said latching tongues having a narrow notch opening through one lateral edge thereof thereby facilitating offsetting the free end portion of said tongues slightly from the plane of said tongues to provide a latching tab.

4. The combination defined in claim 2 characterized in that the adjacent ends of the T-head of said second and third stringers are notched so that the bottom surface of its channel shaped T-head seats flush against the lateral edge of the corresponding portion of the T-head of said first stringer, and the adjacent ends of the sidewalls of the T-head of said second and third stringers being shaped to lie flush with the corresponding interior surfaces of the T-head of said first stringer.

5. In combination, a ceiling grid assembly comprising:
a first continuous stringer of T-shape in cross-section and characterised by a channel-shaped T-head having an open side facing away from and lying in a plane normal to and spaced from the T-stem portion thereof,
said T-stem portion having an elongated opening therethrough with its longer dimension extending normal to said channel-shaped T-head and its shorter dimension corresponding to double the thickness of said T-stem portion;
the sidewalls of said channel-shaped T-head having aligned openings therethrough positioned opposite the adjacent end of said elongated opening,
second and third stringers of the same size and shape as said first stringer and interlocked therewith from the opposite sides of said first stringer,
said second and third stringers each being formed in the T-stem portion thereof with a latching tongue inserted one from either side of said first stringer with said latching tongues lying side by side through said elongated opening and having tabs in interlocking engagement with a rim edge of the adjacent longer side of said elongated opening,
and one portion of the adjacent ends of the T-heads of said second and third stringers lying flush against the juxtaposed exterior surfaces of the T-head of said first stringer and other portions of the T-head of said second and third stringers extending into the adjacent one of said aligned openings with lateral surface areas thereof lying flush against the juxtaposed surface areas of said aligned openings and cooperating therewith to resist movement of said stringers relative to one another.

6. The combination defined in claim 5 characterized in that the sidewalls of said T-heads include narrow inturned lips extending lengthwise of the interior of said T-heads and parallel to the bottom thereof.

7. The combination defined in claim 5 characterized in that a major portion of the end surface of the channel-shaped T-head of said second and third stringers is in abutting contact with the juxtaposed exterior sidewall surface of the T-head of said first stringer.

8. The combination defined in claim 5 characterized in that the end surfaces of the bottoms of the channel-shaped T-heads of said second and third stringers are in abutting contact with a respective juxtaposed exterior edge of the bottom of the T-head of said first stringer.

9. The combination defined in claim 5 characterized in that said other portions of the T-head of said second and third stringers include portions along the outer edges of the sidewalls of their T-heads cooperating with the juxtaposed surfaces of the T-head of said first stringer to resist rotary movement of said second and third stringers about the longitudinal axes thereof and normal to the plane of the T-stem of said first stringer.

10. In a grid system for a ceiling, a joint assembly comprising in combination:

first and second stringers of T-shape in cross-section and having a T-stem and a hollow T-head;
said first stringer having an associated set of openings through the T-stem and the T-head thereof which openings have axial surfaces lying in planes generally normal to said T-stem;
said second stringer having one end thereof formed with a plurality of extensions positioned and sized to be assembled into the respective one of said set of openings in said first stringer and including means for holding said first and second stringers firmly and snugly in assembled position and normal to one another with said extensions cooperating with said openings to prevent movement of said first and second stringers relative to one another; and
the T-head of said second stringer having a transverse end surface lying in a plane generally normal to the T-stem thereof stringer and shaped to abut and internest with juxtaposed portions of said opening through the T-head of said first stringer and cooperating to resist relative movement of said stringers in the plane thereof and rotary movement about the longitudinal axes of said stringers.

11. A ceiling grid joint assembly as defined in claim 10 characterized in the provision of a third stringer having an end thereof formed with a plurality of extensions corresponding to the extensions on the end of said second stringer;
said set of openings in said first stringer being disposed and sized to receive and seat the extensions of said second and third stringers inserted thereinto from the opposite sides of said first stringer; and
means for holding said first and third stringers in assembled position normal to one another with the extensions of said third stringer cooperating with said openings to prevent movement of said first and third stringers relative to one another.

12. A ceiling grid joint assembly as defined in claim 10 characterized in that said set of openings in said first stringer include an elongated opening through said T-stem and aligned openings through the sidewalls of said T-head.

13. A ceiling grid joint assembly as defined in claim 11 characterized in that said set of openings in said first stringer includes an elongated opening the width of which is approximately double the thickness of said T-stem thereby to accommodate an extension from the T-stem of said second and third stringers in side-by-side relation in the same elongated opening.

14. A ceiling grid joint assembly as defined in claim 13 characterized in that said means for holding said first, second and third stringers assembled to one another includes a latching tab on the T-stem extensions from said second and third stringers which latching tab is engageable with rim edge portions of said elongated opening remote from the stringer provided with that latching tab.

15. A ceiling grid joint assembly as defined in claim 10 characterized in that major surface areas of the T-head portion of said second stringer are in direct contact with juxtaposed surface areas of the T-head of said first stringer and cooperate therewith in arresting relative movement of said first and second stringers toward one another as well as relative rotary movement therefor about a longitudinal axis of said second stringer.

16. A ceiling grid joint assembly as defined in claim 10 characterized in that said T-head of said stringers is channel-shaped with its open side facing away from said T-stem.

17. A ceiling grid joint assembly as defined in claim 16 characterized in that the sidewalls of said channel-shaped T-heads are parallel to one another and have inwardly projecting lips along the free edges thereof.

18. A ceiling grid joint assembly as defined in claim 16 characterized in that the provision of at least three extensions on said one end of said second stringer and including a wide long tongue forming part of the second stringer T-stem and relatively short extensions disposed one along either lateral side of said hollow T-head in areas thereof remote from the tongue extension of said T-stem.

19. A ceiling grid assembly as defined in claim 10 characterized in that said sets of openings include an elongated opening in the T-stem of said first stringer the longer axis of which lies generally midway between the remotely spaced edges of the associated openings through the T-head of said first stringer.

20. A ceiling grid assembly as defined in claim 10 characterized in that said hollow T-head is channel-shaped with its open side facing away from said T-stem, and the sidewalls of said channel-shaped T-head having lips projecting inwardly therefrom adjacent the free edges of said sidewalls.

21. A ceiling grid assembly as defined in claim 20 characterized in that said inwardly projecting lips provide seats adapted to engage and retain the head of a fastener captive but free to slide lengthwise of said stringer.

22. In combination, a ceiling grid joint assembly comprising a first continuous lightweight stringer of T-shape in cross-section and characterized by a channel-shaped T-head having an open side facing away from and lying in a plane normal to the T-stem portion thereof, said T-stem portion having a rectangular opening therethrough with its longer dimension extending normal to the web of said channel shaped T-head and its shorter dimension corresponding to double the thickness of said T-stem portion, the sidewalls of said T-head having identical notches in direct alignment with one another crosswise of said T-head in an area opposite the adjacent end of said rectangular opening, said notches having a depth corresponding to a substantial portion of the height of the sidewalls thereof and a maximum width corresponding to the distance between the exterior sidewall surfaces of said T-head, second and third stringers of the same size and shape as said first stringer and interlocked therewith from the opposite sides of said first stringer, said second and third stringers each being formed in the T-stem portion thereof with a latching tongue inserted one from either side of said first stringer with said latching tongues lying side by side through said rectangular opening and having tabs having interlocking engagement with a rim edge of the adjacent longer side of said rectangular opening and with portions of the ends of the T-heads of said second and third stringers seated in an adjacent one of an associated one of said pair of identical notches in the T-head of said first stringer and mutually cooperating to resist movement of said first, second and third stringers relative to one another in the plane thereof and rotary movement of each of said stringers about the respective longitudinal axes thereof.

* * * * *

UNITED STATES PATENT AND TRADEMARK OFFICE
CERTIFICATE OF CORRECTION

PATENT NO. : 4,043,689

DATED : August 23, 1977

INVENTOR(S) : William H. Spencer et al.

It is certified that error appears in the above-identified patent and that said Letters Patent are hereby corrected as shown below:

Column 10, line 18, after "thereof" delete "stringer".

Signed and Sealed this

Twenty-third Day of May 1978

[SEAL]

Attest:

RUTH C. MASON
Attesting Officer

LUTRELLE F. PARKER
Acting Commissioner of Patents and Trademarks